(12) United States Patent
Friedrich

(10) Patent No.: US 7,077,013 B2
(45) Date of Patent: Jul. 18, 2006

(54) DEVICE FOR MEASURING THE WEIGHT FLOW RATE OF A MASS FLOW

(76) Inventor: Claus Friedrich, Holzmühlerweg 100, D-35457 Lollar (DE)

( * ) Notice: Subject to any disclaimer, the term of this patent is extended or adjusted under 35 U.S.C. 154(b) by 0 days.

(21) Appl. No.: 11/176,849

(22) Filed: Jul. 7, 2005

(65) Prior Publication Data

US 2006/0005636 A1      Jan. 12, 2006

(30) Foreign Application Priority Data

Jul. 8, 2004      (DE) .................... 10 2004 033 007

(51) Int. Cl.
*G01F 1/82* (2006.01)
(52) U.S. Cl. ............................... 73/861.353
(58) Field of Classification Search .......... 73/861.354, 73/861.353, 861.351, 861.352, 861.356
See application file for complete search history.

(56) References Cited

U.S. PATENT DOCUMENTS

| | | | |
|---|---|---|---|
| 2,832,218 A | 4/1958 | White | |
| 3,331,244 A | 7/1967 | Henderson | |
| 4,012,957 A * | 3/1977 | Chiles et al. | 73/861.82 |
| 4,181,020 A * | 1/1980 | Herzl | 73/861.24 |
| 5,654,654 A * | 8/1997 | Franklin | 327/103 |
| 5,728,951 A * | 3/1998 | Van Cleve et al. | 73/861.354 |
| 6,705,171 B1 * | 3/2004 | Toerner | 73/861.354 |
| 6,729,192 B1 * | 5/2004 | Feller | 73/861.77 |

FOREIGN PATENT DOCUMENTS

| | | |
|---|---|---|
| DE | 3346145 A1 | 7/1985 |
| DE | 201 15 010.7 | 1/2002 |
| DE | 696 25 184 T2 | 5/2003 |
| EP | 0146 902 | 7/1985 |
| EP | 0 590 187 B1 | 4/1994 |
| EP | 10253078 * | 4/2004 |
| WO | WO 96/29574 | 9/1996 |

* cited by examiner

*Primary Examiner*—Jewel V. Thompson
(74) *Attorney, Agent, or Firm*—Collard & Roe, P.C.

(57) ABSTRACT

Device for measuring a mass flow according to the Coriolis principle comprises impeller driven at a constant speed, on which the flow of materials is fed, redirected and accelerated, and whereby the torque of the impeller is measured. The impeller is suspended on a torsion spring bar, which is arranged within a sleeve shaft. The torsion spring bar drives the impeller. There is at least one sensor to measure the angular shift between the powering sleeve shaft and the impeller.

5 Claims, 3 Drawing Sheets

DEVICE FOR MEASURING THE WEIGHT FLOW RATE OF A MASS FLOW

BACKGROUND OF THE INVENTION

1. Field of the Invention

According to the invention, the device relates to the measurement of a mass flow, such as that of bulk solids consisting of cereal grain, based on the Coriolis measuring principle. The measuring element is formed by an impeller that is driven at a constant speed. This impeller is acted upon axially by a flow of bulk solids. The bulk solids are fed radially by a channel assembly to the guide vanes, which in turn accelerate them to a constant circumferential velocity. The torque required for this is exactly proportional to the weight-based bulk flow. Reference is made to the German patent DE 33 46 145 A1 and the European patent application EP 0 146 902 A2 with regard to the measuring principle; the disclosures of which are herein incorporated by reference.

2. The Prior Art

The quantity to be measured by this weighing system is the exact torque. A power measurement at the motor, a familiar part of the prior art, is too inaccurate. A torque measurement directly on the impeller's drive shaft is very complex, which is why the motor oscillates suspended and the reaction torque is recorded using a weighing cell, in line with the prior art. This torque measurement is very precise. The problem here, however, is in measuring very low amounts of torque at small flow rates due to the relatively large weight of the motor and the bearing friction that occurs.

In the prior art, this problem is corrected by having the impeller itself oscillate suspended and powered by a type of shock absorber. Depending on the required torque, this results in an angular displacement of the drive shaft relative to the impeller and thereby in the actual weight rate of flow. The timing of this angular shift is measured with each revolution by two proximity switches. The time interval between the rigid drive shaft and the spring-driven impeller corresponds to the required torque and thus to the mass flow rate.

This measuring system is described in the German utility model number 201 15 010.7. The problem involved in this arrangement, however, lies in the necessity of situating the impeller in areas that are subjected to dust and in providing a frictionless seal for it.

SUMMARY OF THE INVENTION

It is therefore an object of the invention to provide a device for measuring a mass flow that does not exhibit the disadvantages named.

This object is accomplished by a device in which the impeller is suspended on and simultaneously powered by a torsion spring bar. This allows a frictionless support of the impeller without the influences of dust or dirt. Two plain bearing brushes between the torsion bar and the drive axle, which is constructed as a sleeve shaft, are all that is needed to horizontally position the impeller. These slide bearings, which only have to withstand the angular shift, generate no objectionable friction, since the simultaneous rotation of the hollow axle and torsion spring bar prevents an eventual occurrence of hysteresis of the angular shaft.

The angular shift between the drive shaft and the impeller is advantageously registered in the evaluation electronics that are part of the measuring system by measuring the pulse interval. This angular shift is proportional to the respective mass flow rate in kg/h.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
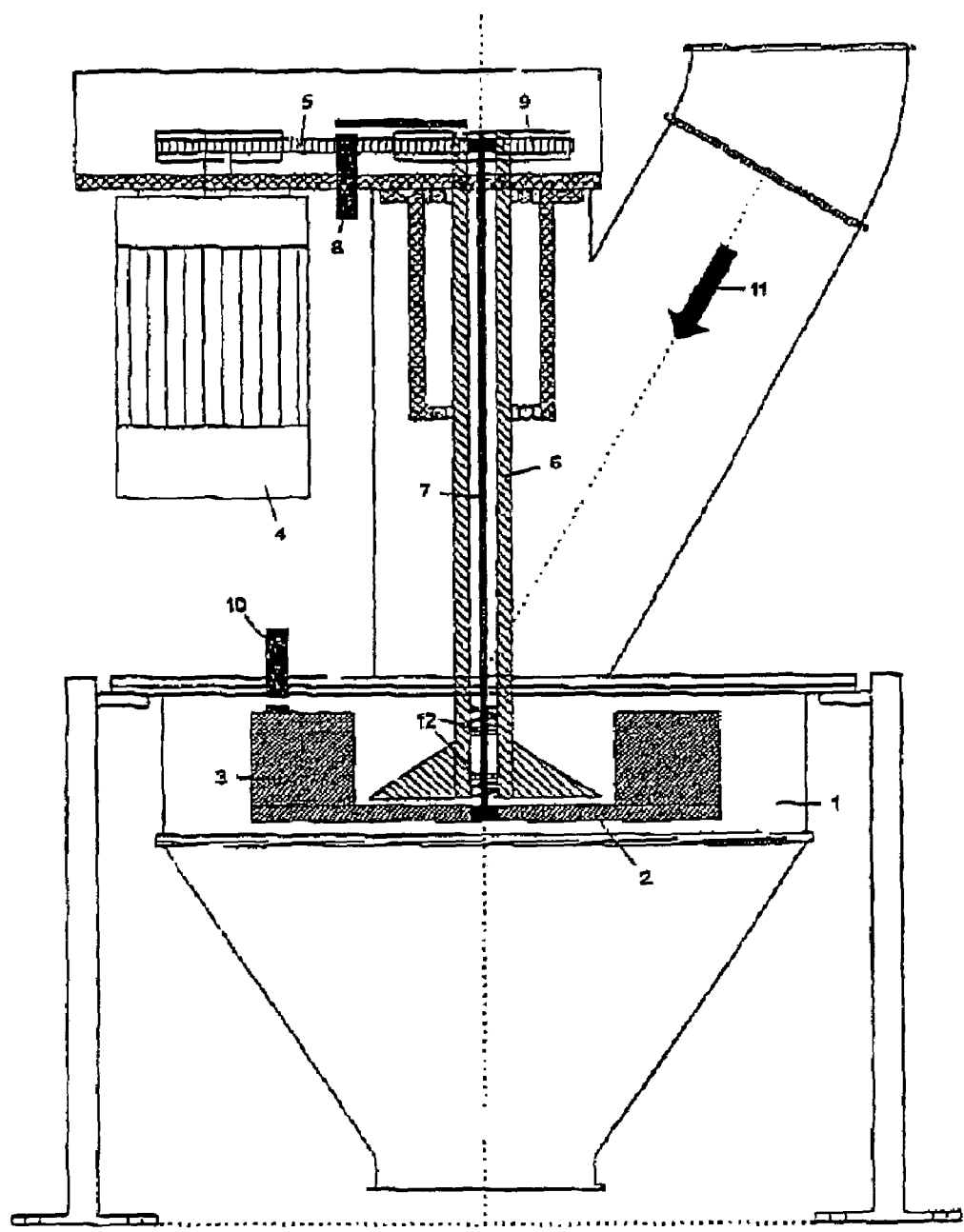
FIG. 1 shows a device according to one embodiment of the invention with two sensors in longitudinal section.

Referring now in detail to the drawings, FIG. 1 shows an impeller 2 with guide vanes 3 arranged vertically in a rounded housing 1. Impeller 2 is driven at a constant speed by an electric motor 4 by a belt drive 5 and a drive shaft 6. Impeller 2 oscillates suspended on a torsion spring bar 7. Drive shaft 6 is constructed as a sleeve shaft and powers impeller 2 from above through the torsion spring bar 7.

The mass flow 11 is fed centrally to impeller 2 and accelerated radially by guide vanes 3. Depending on the bulk mass flow and the rigidity of torsion spring bar 7, impeller 2 is shifted by a defined angle relative to the drive shaft 6. This angular shift is detected by two no-contact sensors 8, 10 at every revolution. The first sensor 8 is situated in the area of a drive gear 9; the second sensor 10 is located above impeller 2. The settings of these two sensors 8, 10 are such that with every revolution, first sensor 8 generates a pulse edge followed shortly thereafter by second sensor 10 producing another pulse edge. Precise timing measures and analyzes these pulse edges.

Impeller 2, which is twistable about its axis, is guided horizontally in two slide bearings 12. Because these bearings 12 absorb only the angular shift, they are subjected to practically no wear. Through the rotation of sleeve shaft 6, these slide bearings produce no hysteresis that could misrepresent the measurement results.

The novel thing about this invention is that impeller 2 is suspended on torsion spring bar 7. The flow rate is measured using the torsion of impeller 2 to sleeve shaft 6 and the displacement of impeller 2 to sleeve shaft 6, Impeller 2 slows down when bulk solids, such as grain 11 for example, hit impeller 2, so that torsion occurs.

Figure 2:
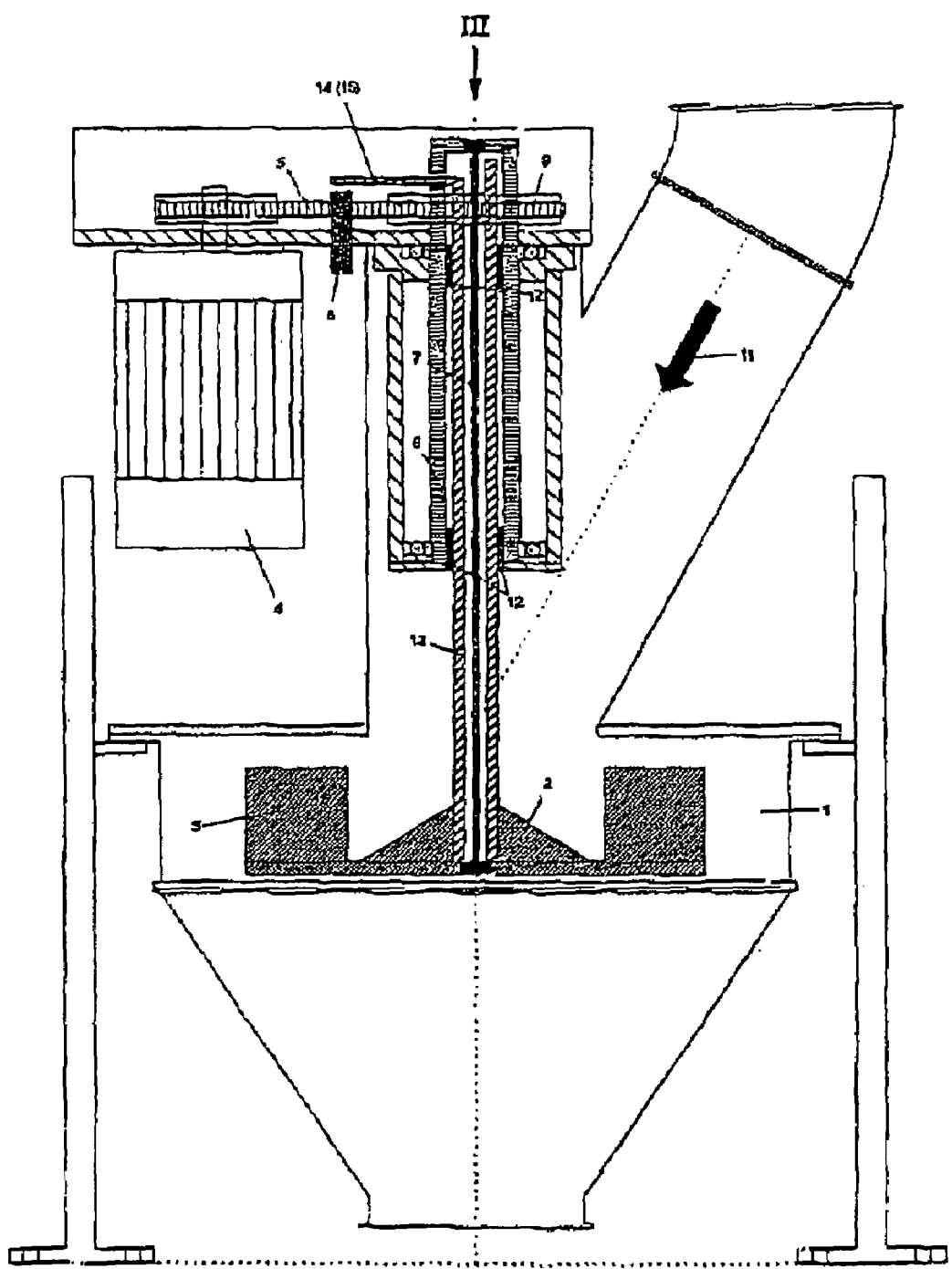
FIG. 2 shows a device according to one embodiment of the invention with one sensor in longitudinal section.

Another embodiment is illustrated in FIG. 2 with which it is possible to register the pulse intervals with only one sensor 8 on the drive gear 9. By the addition of a second sleeve shaft 13, which is situated in the first sleeve shaft 6 in a manner that allows it to rotate freely, the torsion angle of impeller 2 that is tensionally locked to second sleeve shaft 13 and driven by torsion spring bar 7 is passed upward through drive gear 9 where it is registered by only one sensor 8 at the same height as the angle of drive gear 9.

Figure 3:
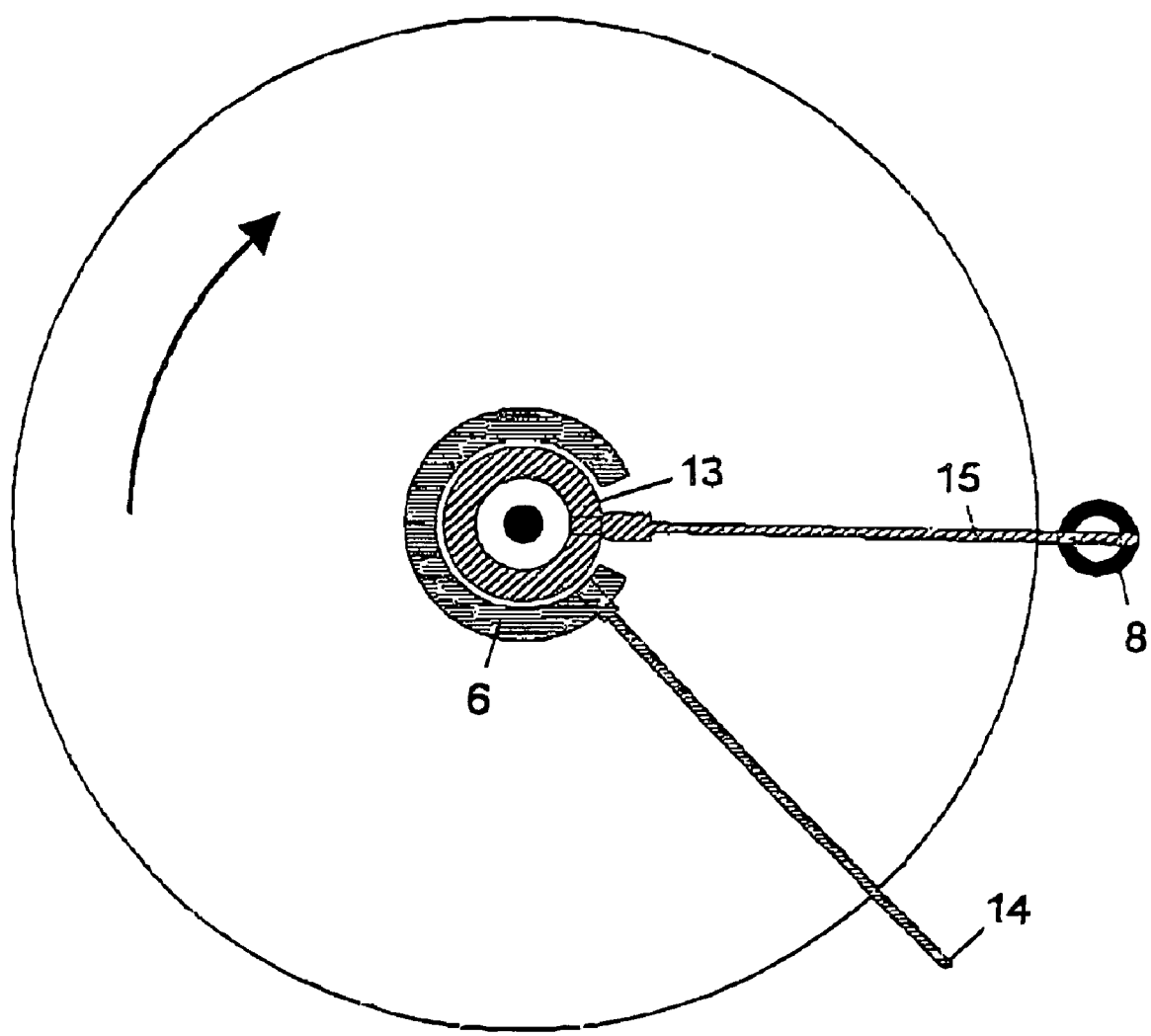
FIG. 3 shows a top view in the direction of Arrow III of FIG. 2.

Measuring the angle of rotation is depicted in FIG. 3. The outside sleeve shaft 6 is driven by motor 4 and uses its horizontal bar 14 to activate sensor 8. A few milliseconds later, depending on the respective torsion angle, horizontal bar 15 then activates sensor 8. The evaluation electronics compute the rate of weight flow from this pulse time interval.

The advantage of this configuration is that two sensors can avoid measurement errors caused by temperature variables and other influences on the switching interval. Another significant benefit of this device produced using this invention is the ability to measure the pulse outside the zone of dust and dirt.

Accordingly, while only a few embodiments of the present invention have been shown and described, it is obvious that many changes and modifications may be made thereunto without departing from the spirit and scope of the invention.

LIST OF REFERENCE NUMBERS

1 Housing
2 Impeller
3 Glide vanes
4 Electric motor
5 Belt drive
6 Drive shaft
7 Torsion spring bar
8 Sensor
9 Drive gear
10 Sensor
11 Mass flow
12 Slide bearing
13 Sleeve shaft
14 Bar on sleeve shaft (6)
15 Bar on sleeve shaft (13)

What is claimed is:

1. A device for measuring a mass flow according to the Coriolis principle comprising:
   an impeller on which the mass flow is fed, redirected and accelerated, the impeller being suspended on a torsion spring bar, said spring bar being arranged within a sleeve shaft in a vertical and hysteresis-free manner, and driving the impeller at a constant speed; and
   at least one sensor connected to the sleeve shaft and the impeller, to measure angular shift between the sleeve shaft and the impeller.

2. A device according to claim 1, wherein said sleeve shaft comprises a first sleeve shaft driven by a driver, and further comprising a second sleeve shaft, wherein said sensor measures an angle of rotation of the second sleeve shaft and the angle of rotation of the first sleeve shaft, and wherein the impeller is tensionally connected with the second sleeve shaft.

3. A device according to claim 2, wherein the second sleeve shaft is fed through a drive gear.

4. A device according to claim 2, wherein there are two sensors, with one of said sensors being arranged in an area of a drive gear of the sleeve shaft and another of said sensors being arranged in an area of the impeller.

5. A device according to claim 2, further comprising a bar arranged on the first sleeve shaft and another bar arranged on the second sleeve shaft, said bars triggering the sensor.

* * * * *